June 25, 1957     O. H. BUSCHMANN     2,796,744
REFRIGERANT COMPRESSOR COOLING

Filed Feb. 23, 1954     2 Sheets-Sheet 1

INVENTOR.
Oskar H. Buschmann.
BY
Harness, Dickey & Pierce
ATTORNEYS.

June 25, 1957     O. H. BUSCHMANN     2,796,744
REFRIGERANT COMPRESSOR COOLING
Filed Feb. 23, 1954     2 Sheets-Sheet 2
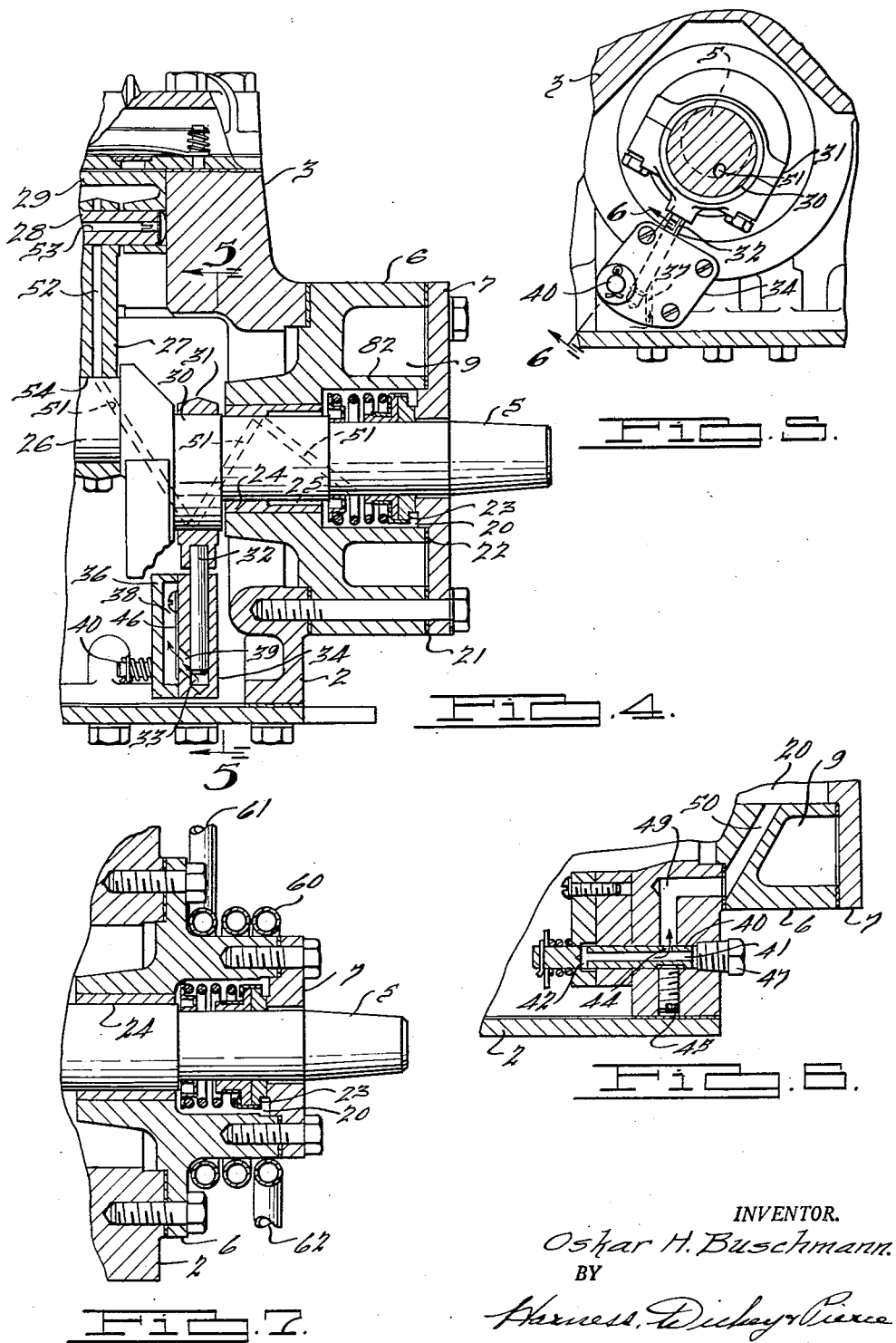
INVENTOR.
Oskar H. Buschmann
BY
Harness, Dickey & Pierce
ATTORNEYS.

United States Patent Office 2,796,744
Patented June 25, 1957

2,796,744
REFRIGERANT COMPRESSOR COOLING

Oskar H. Buschmann, Sidney, Ohio, assignor to Copeland Refrigeration Corporation, Sidney, Ohio, a corporation of Michigan Application February 23, 1954, Serial No. 411,611

8 Claims. (Cl. 62—117.7)

This invention relates generally to refrigerating means of the type utilizing mechanical compression of a volatile refrigerant, and more specifically to improved means for preventing overheating of components such as bearings and seals.

It is an object of the invention to provide improved means whereby the residual cooling capacity of the suction gas entering the compressor is effective to cool the lubricating oil in the compressor, and prevent overheating of the oil, as well as of mechanical components of the compressor as noted previously.

Refrigerator compressors are conventionally made in such a manner that a part of the casing thereof, such as the crankcase of a reciprocating compressor, is utilized as a part of the inlet system. In the case of externally-driven compressors, pressure seals having frictionally engageable parts must be employed. Whatever type of pressure seal is employed, the seal and bearings are apt to heat up, due at least partly to the tight engagement which must be maintained between the sealing members. Moreover, most such compressors employ some means such as splash lubrication, forced feed of lubricant, or both, for supplying lubricant to connecting rod and wrist-pin bearings. Under some operating conditions to which compressors are subjected, the oil and frictionally engaging parts become overheated, the viscosity and lubricating value of the oil reduced, and its tendency to be carried over with the compressed refrigerant increased. This problem is particularly severe in the case of systems such as automotive air conditioning systems, where the compressor is driven from the engine or wheels of a vehicle, or other source of power which is not regulated in accordance with the demands of the refrigerating system, and which may result in the compressor being operated at excessive or unnecessarily high speeds for sustained periods. In the past, separate air-cooled or refrigerant-cooled oil coolers have been employed.

It is the principal object of this invention to provide improved cooling means for a refrigerator compressor having incorporated therein an integral chamber arranged to serve both as a seal and bearing chamber and as an oil cooling chamber, the arrangement being effective to cool not only the seal and end bearing means, but also the shaft seal and the entire oil or lubricant supply, the oil thereby being effective to absorb heat from all internal friction surfaces, such as the pistons, cylinder walls, wrist pins and connecting rod bearings.

Another important object of this invention is to provide a refrigerator compressor having incorporated therein a means of utilizing the residual cooling capacity of its suction gas to cool its bearings, shaft seals, connecting rod and wrist-pin bearings and the like.

Still another object is to provide a refrigerant compressor having an integral oil-cooling, oil-distributing system adapted to supply cooled oil to all bearings and seals.

Still other objects and advantages of the invention will become apparent in the description and with reference to the accompanying drawings, in which:

Fig. 4 is a fragmentary transverse elevational view in section, the view being taken along the line 4—4 of Fig. 1;

Fig. 5 is a fragmentary end view in section with the end bearings, the shaft end and its seal, and portions of the compressor housing broken away to show the oil pump and its manner of attachment to the crankshaft, the view being taken along the line 5—5 of Fig. 4;

Figure 1:
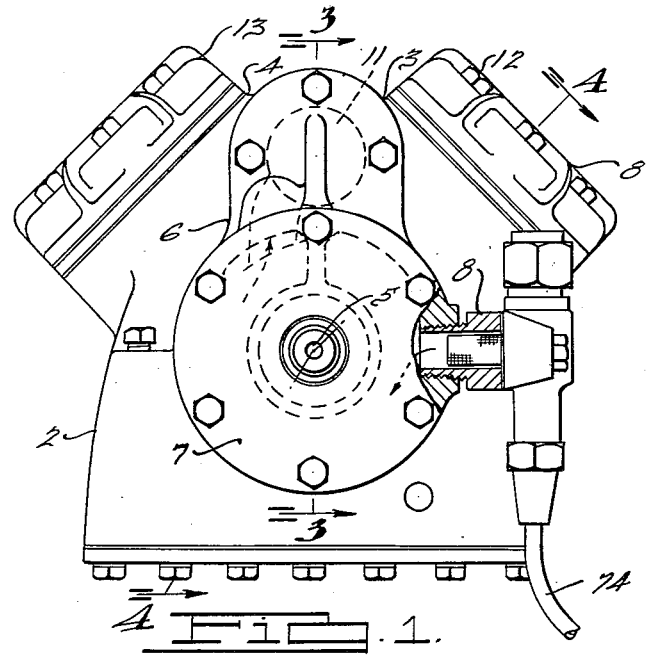
Figure 1 is an end view of a compressor constructed in accordance with the present invention, with portions broken away to show the entrance of suction gas to the oil-cooling chamber.

Fig. 6 is a fragmentary view in section showing the oil discharge passageway leading from the pump to the shaft-seal chamber, the view being taken along the line 6—6 of Fig. 5; and Fig. 7 is a fragmentary elevational view, in section, showing a cooling coil wrapped around the end housing (second embodiment or means of cooling the shaft seal chamber), the view being taken as if viewed along the line 3—3 of Fig. 1.

Figure 2:
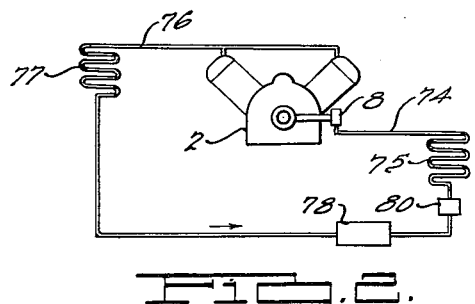
Fig. 2 is a schematic diagram of a refrigerating system embodying the invention.
Figure 3:
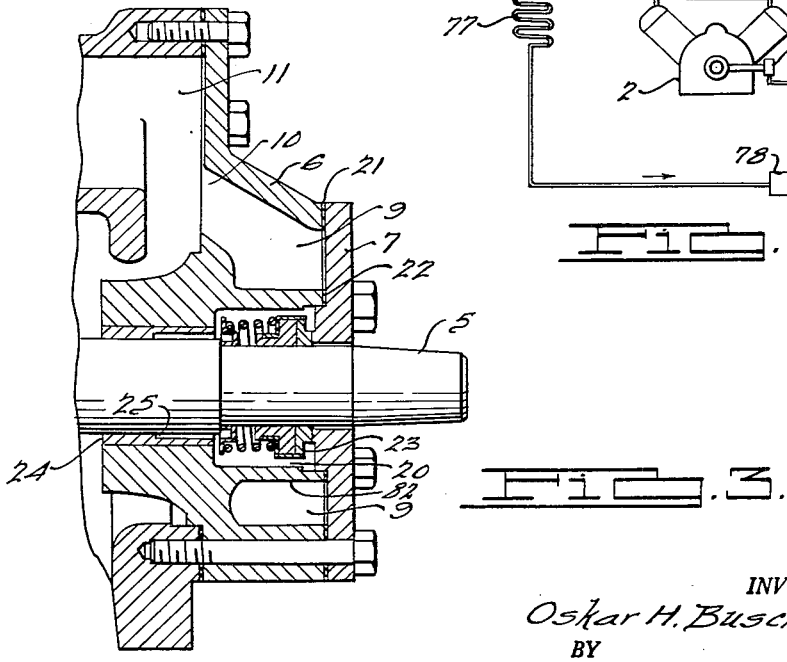
Fig. 3 is a fragmentary transverse elevational view in section showing the shaft seal and oil-cooling chamber and its connection with the crankcase proper, the view being taken along the line 3—3 of Fig. 1.

Referring first to Figs. 1, 2 and 3 of the drawings, it will be seen that the compressor illustrated has a sealed casing comprising a base or crankcase housing 2 to which are attached two opposed V-type cylinder banks 3, 4. Running lengthwise of the compressor is a crankshaft 5 which is journalled, on the end visible, in an end housing 6. Secured to the housing 6 is a shaft seal cover plate 7. A T-shaped tubing connection 8 is tapped into the end housing 6 so as to communicate directly with an annular cooling chamber 9, disposed about the end of the shaft 5. The latter chamber communicates directly through passageways 10 and 11 with the interior of the compressor crankcase 2. As shown in Fig. 2, the return line 74 from the evaporator 75 is connected to the inlet T 8, and it is presumed that the compressor draws the gas from the crankcase, and pumps the compressed refrigerant, via conduit 76, to the condenser 77, whence it flows to the receiver 78 and then to the evaporator via restriction means 80.

Refrigerant suction gas enters the compressor in the direction indicated by the arrows of Fig. 1 through the fitting 8, into the housing 6, then passes through the annular cooling chamber 9 and into the crankcase.

Incorporated within the housing cover 6 is an annular shaft seal chamber 20 located about the crankshaft 5. This latter chamber is separated from the cooling chamber 9 by an integral metallic wall 82. The chamber 9 opens outwardly and is sealed by means of the cover plate 7 and gaskets 21, 22. The integral wall 82 constitutes an effective heat bridge permitting efficient transfer of heat, by conduction, between cooling chamber 9 and seal chamber 20. In the seal chamber 20 is a conventional spring-loaded shaft seal mechanism 23 of the metal-on-metal type which seals the protruding end of the crankshaft 5 against loss of lubricant and against ingress of moisture, air, etc. Inwardly from the shaft seal 23, the crankshaft 5 is journalled in a bearing 24 which is cut away to form an annular oil passageway 25 communicating with the shaft seal chamber 20.

Referring now to Fig. 4, it will be seen that one throw 26 of the crankshaft 5 is shown connected to a connecting rod 27 in which is inserted a wrist pin 28 and attached thereto is a piston 29. Also formed as an integral part of the crankshaft 5 is an eccentric 30. About the eccentric 30 is disposed a split strap 31. The strap 31 holds an oil pump piston 32 which is actuated up and down by the eccentric 30. The oil piston 32 fits into the cylinder 33 in an oil pump casing 34, the latter being bolted to the end of the crankcase, as shown in Fig. 5. Bolted to the pump casing 34 is a tight fitting cover plate 36. The oil pump casing 34 has a drilled oil inlet passageway 37 (Fig. 5) leading to the crankcase sump, the inlet end of passageway 37 normally being below the level of the oil therein. The pump cover plate 36 is cut away interiorly to define an oil discharge chamber 38. Between the pump cylinder 33 and the oil discharge chamber 38 is a drilled opening or passageway 39. The passageway 39 is drilled downwardly into the cylinder 33 so as to open therein at a lower point than the inlet end of passageway 37. With this arrangement, the piston 32 functions as the inlet valve, cutting off the inlet opening 37 on the downward stroke and never quite closing the outlet opening.

The rod 40 is drilled for a portion of its length to form a central oil passageway 41. At the left end of the passageway 41 adjacent the pump cover plate 36 is a transverse hole or port 42 bored completely through the rod 40 at right angles and through the central passageway 41, communicating with oil discharge chamber 38 through a flat spring flap valve 46 which is biased to close passage 39 and prevent back flow to the cylinder. At the right end of the passageway 41, a second hole or port 44 is bored into the center of the passageway 41. On the bottomside of the pump casing 34 a set screw 45 having a tapered upper end holds the rod 40. At the right hand end of the rod 40 a plug 47 is screwed into the pump casing 34. When the oil pump piston 32 is moving upward, a suction is created in the chamber 38 which closes the flap valve and draws oil from the sump. When the piston descends, the oil is forced from the passageway 49 through a communicating passageway 50 located in the compressor end housing 6 and into the shaft seal chamber 20, which is normally kept full of oil when the compressor is operating. While in the chamber 20 the oil lubricates the shaft seal mechanism 23 and bearing 24. It also is cooled by suction gases circulating through the cooling chamber 9, which extract heat therefrom directly through the wall 82. This action is very efficient because of the extended surface of the wall 82, the fact that the wall is wetted on one side by the oil and on the other side is in direct contact with the refrigerant and further by the nature of the wall 82, which is preferably sand cast, and left rough on its inner and outer surfaces.

From chamber 20 the oil flows through a plurality of diagonal oil distributing passageways 51, 51 drilled in the crankshaft 5. The latter supply cooled oil to the eccentric 30, the bearing of connecting rod 27 and up to a rifle-drilled connecting rod passageway 52 and wristpin passageway 53. The passageways 51, 51 thus lead the oil successively through all bearings. Escaping oil flows back into the bottom of the crankcase housing 2 for recirculation. In this way a continuous supply of cooled oil is supplied to the shaft seal and all bearing surfaces in the compressor. The oil is continuously recirculated and kept at a safe operating temperature.

In the compressor illustrated the cooling action is derived from suction gas entering the compressor. As it enters the compressor end housing 6 through T-fitting 8, it expands into the cooling chamber 9. During this expansion, the suction gas is able to pick up heat from the walls of the cooling chamber 9. In virtually all refrigerant systems, the suction gas has substantial residual heat absorbing ability, and in some applications, such as automotive air conditioning systems, the residual heat absorbing capacity of the suction gas may be very high, particularly when the car is travelling at high speed, which is of course the time when bearing and seal cooling is most advantageous. The heat absorbing ability of the suction gas is augmented by its ability to expand in the enlarged cooling chamber 9 which is connected to the crankcase through openings (10, 11) of large cross-section, so that the pressure-reducing effect of the compressor is fully effective in chamber 9. In this way the oil-cooling system of this invention does not entail the use of separate water- or air-cooled heat exchangers nor does it entail the loss of efficiency resulting from the use of condensed, unexpanded refrigerant for oil cooling purposes.

A second embodiment of the invention is shown in Fig. 7. In this form, the integral cooling chamber is dispensed with, and cooling action is derived by wrapping a plurality of coils 60 of tubing, preferably metallic, around the end housing, which in this case is a simple seal housing of conventional character. In this form the details of the oil circulation system are similar to those of the other figures, the oil being cooled, as before, in the shaft seal chamber 20. In this form of the invention, the refrigerant coils 60 also are carrying suction gases. The coils 60 are closely coupled at either of its ends 61 or 62 to the compressor inlet while the other of the ends of the coils is connected to the refrigerant suction line leading from the evaporator, since the direction through the coils of the suction gas is of little consequence. The coils 60 may have a larger diameter than the main suction return line so as to permit slight expansion therein for augmented cooling action, and they are tightly engaged with, and may be soldered or brazed to the seal chamber wall, to provide an improved heat bridge. If desired, the coils may also be covered by a layer of insulation to prevent pick-up of heat from the outside atmosphere. The embodiment of Fig. 7 is best adapted to cool the bearings, shaft seals and oil in already built compressors not provided with integral cooling chambers.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. In combination with a refrigerating system including a refrigerant compressor having a housing and shaft sealing means, an oil cooling system adapted to utilize the residual cooling capacity of refrigerant in the compressor suction line comprising a shaft sealing mechanism normally disposed in an oil-filled chamber within said housing, an annular cooling chamber defined by said housing and coaxially disposed about said shaft seal chamber in heat transfer relation thereto, said cooling chamber having an outlet and an exterior inlet opening, an oil pump for drawing oil from a reservoir thereof, said pump and said reservoir being enclosed within said housing, a passageway within said housing connecting the outlet of said pump to said shaft seal chamber, interconnected oil conveying passageways in said compressor shaft for conducting oil from said oil-filled chamber to bearing surfaces in said compressor, and a refrigerant passageway connecting said cooling chamber outlet with the suction gas manifold of said compressor.

2. In combination with a refrigerating system and a reciprocating refrigerant compressor having a housing, an oil-cooling system comprising a shaft sealing mechanism through which the crankshaft of said compressor extends, said mechanism being disposed within a chamber defined by said housing, an annular cooling chamber defined by said housing disposed coaxially around said shaft seal chamber and separated therefrom by a heat conductive wall, said cooling chamber having an outlet communicating with the suction gas manifold of said compressor and having an inlet exterior of said housing, an oil pump operating off said crankshaft, an oil conveying passageway connecting said oil pump and said shaft seal chamber, an oil distributing passageway leading from the shaft seal chamber to frictionally engaging bearing portions of said compressor, and means for conducting refrigerant suction gas to said inlet of the said cooling chamber.

3. In combination with a refrigerating system including a refrigerant compressor having an inlet, an outlet, a shaft, shaft sealing means and a circulatory oiling system the improvement comprising, oil cooling means including means defining an oil containing chamber in series flow communication with said oiling system and located about said shaft sealing means, means defining a cooling chamber separate from said oil containing chamber, a heat-conductive bridge including a wall section common to both of said chamber means, said cooling chamber having an outlet communicating with said inlet of the compressor and an inlet communicating with a source of refrigerant suction gas and being in flow series with the low pressure side of said system.

4. Means as claimed in claim 3 wherein both of said chambers are substantially annular, and said wall section is a substantially annular partitioning wall directly engageable on one side by oil in the oil-containing chamber and directly engageable on the other side by refrigerant in the cooling chamber.

5. In combination with a refrigerating system including a refrigerant compressor incorporated therein, said compressor having an inlet, an outlet, an internal oiling system, a shaft, and sealing means for the shaft having frictionally engageable parts, a cooling system comprising an oil-retaining chamber enclosing said sealing means and in series flow communication with said oiling system, a cooling chamber disposed in heat transfer relationship to said oil-retaining chamber and having an outlet communicating with said compressor inlet and an exterior inlet for communicating with an external refrigerant line carrying suction gas said cooling chamber being in flow series with the low pressure side of said system.

6. A combination as defined in claim 5 wherein said oil-retaining chamber comprises a substantially annular housing enclosing said sealing means, and said cooling chamber comprises a length of tubing wrapped around said housing.

7. In a refrigeration compressor of the type having a housing, a rotatable drive shaft extending from said housing, shaft seal means enclosed within a chamber defined by said housing and surrounding said shaft, and lubricating means completely contained within and enclosed by said housing for circulating a lubricant through said chamber defined by said housing, the improvement comprising conduit means disposed in heat transfer relationship to said chamber and communicating with the suction gas manifold of said compressor, said conduit means being in series flow with said suction gas manifold so that suction gases drawn into said manifold pass through said conduit means for cooling a lubricant contained in said chamber.

8. A refrigeration compressor compressing a housing defining a reservoir and an inlet gas manifold, a drive shaft extending from said housing, shaft seal means enclosed within a seal chamber defined by said housing and surrounding said shaft, passageway means defined by said housing and said shaft for conducting a lubricant from said reservoir through said seal chamber and to other parts of said compressor to be lubricated, means completely contained within and enclosed by said housing for circulating a lubricant through said passageways and said seal chamber, and conduit means disposed in heat transfer relationship to said seal chamber and communicating with said inlet gas manifold, said conduit means defining an inlet adapted to serve as the principal suction gas inlet of said compressor, said inlet being confined in cross section relative to said conduit means so that suction gases entering said conduit means expand to enhance their cooling effect.

References Cited in the file of this patent
UNITED STATES PATENTS

| | | |
|---|---|---|
| 1,568,103 | Tibbetts et al. | Jan. 5, 1926 |
| 1,979,525 | Baumann | Nov. 6, 1934 |
| 2,677,944 | Ruff | May 11, 1954 |